April 5, 1927.
O. H. BAKER
MILK BOTTLE
Filed Feb. 28, 1925
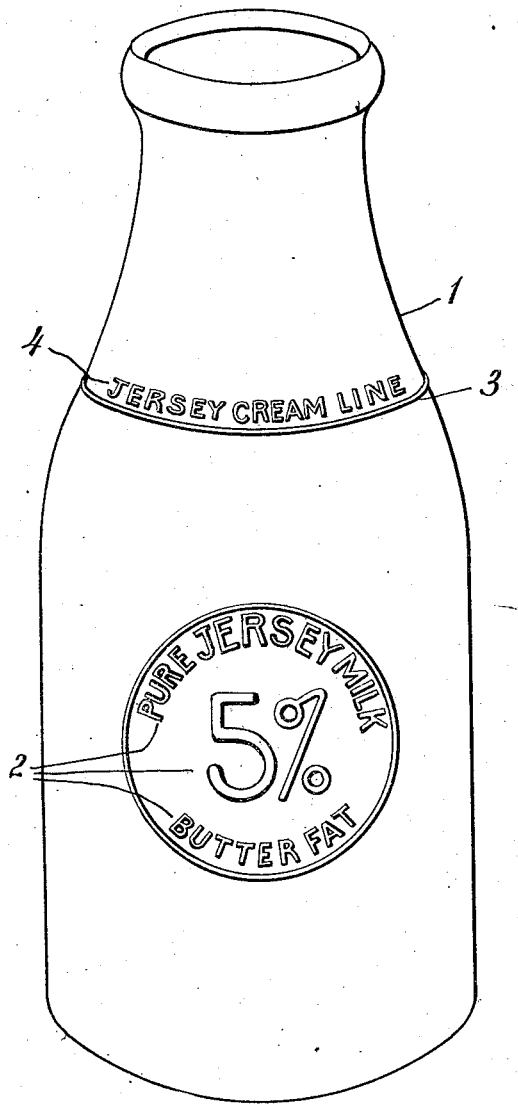
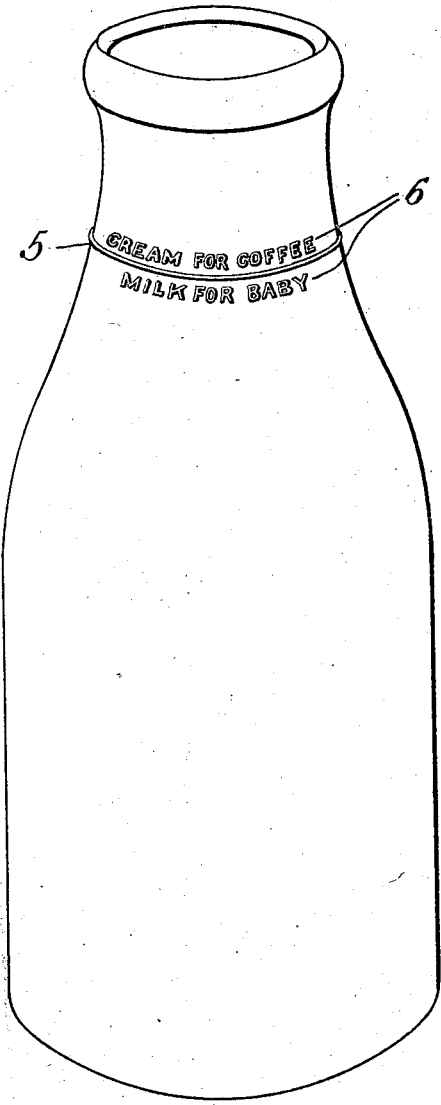
INVENTOR
Oscar H. Baker.
BY
ATTORNEYS Patented Apr. 5, 1927.

1,623,459

UNITED STATES PATENT OFFICE.

OSCAR H. BAKER, OF NEW YORK, N. Y.

MILK BOTTLE.

Application filed February 28, 1925. Serial No. 12,216.

This invention relates to milk containers particularly of the glass bottle type.

One object of the invention is to provide an improved milk bottle which will serve to stimulate the sale of the particular kind of milk for which it is intended.

Another object is to provide a milk bottle bearing a clear indication of the proper location of the cream line for that kind of milk for which the bottle is intended.

A further object is to provide a milk bottle bearing an indication of a certain kind of milk in conjunction with a further indication of the proper location of the cream line for the particular kind of milk indicated on the bottle.

The invention has for its further object to provide a milk bottle bearing the various designations and indicia hereinafter described.

One form of bottle constructed in accordance with the invention is illustrated in the accompanying drawing, in which:—

Fig. 1 is a vertical elevation of one side of the improved bottle, and

Fig. 2 is a vertical elevation of the reverse side thereof.

The bottle is shown at 1 and in the present instance is represented as being of the standard glass type although a more distinctive type may be used should this be desired for commercial, advertising or other purposes. The bottle is provided on one side with indicia denoted in general by the reference character 2 identifying a particular kind of milk and the percentage of butter fat contained in that kind of milk. For instance, this indicia may read "Pure Jersey milk 5% butter fat". The bottle is further provided with a proper cream depth indicating line 3 which is so located on the bottle that for the milk of the kind identified by the indicia 2, the actual cream line should approximately coincide with the line 3 on the bottle. In other words, the line 3 indicates the proper depth for the cream on this particular kind of milk and for this reason the line is herein referred to as a "proper cream depth indicating line." Adjacent to the line 3, the bottle is provided with further indicia 4 which indicates the purpose of line 3. In other words, the indicia 4 which may read "Jersey cream line" identifies the line 3 as an indicator for the proper location of the cream line for milk of the kind referred to in the indicia 2. The indicia 2 and 4 are preferably on the same side of the bottle, as these two sets of indicia are somewhat co-related. The indicating line 3 may or may not extend entirely around the bottle.

The bottle at a higher point, is provided with a second indicating line 5 which may or may not extend entirely around the bottle, and this line has associated with it certain indicia 6 which is preferably located on the reverse side of the bottle as shown in Fig. 2. This indicia preferably consists of the words "Cream for coffee" located above the line 5, and the words "Milk for baby" located below this line. The indicia 6 is therefore descriptive of the purpose for which the cream above the line 5 should be used, namely for coffee, and is descriptive of the purpose for which the milk below the line should be used, namely for the baby. The line 5 is preferably so located that with a milk containing 3½ to 4% butter fat the cream line of the milk will be below the line 5 on the bottle. With the line 5 so placed, when the bottle contains the kind of milk referred to by the indicia 2 the cream above the line 5 will be of the proper character to use for coffee, and the milk below the line 5 will contain approximately the proper amount of butter fat for the baby.

All of the indicia including the lines 3 and 5 may be placed on the bottle in any suitable way, but preferably it is all blown into the glass bottle at the time when the bottle is made, thus causing the indicia to be raised from the surface of the glass or depressed therein in the well known manner.

It will now be seen that the indicia provided on the bottle gives a clear indication of where the cream line should come for that kind of milk referred to on the bottle. For instance, the Jersey milk containing 5% butter fat the cream line should approximately coincide with the "Jersey cream line" 3 on the bottle. If the actual cream line of the milk is above the line 3 on the bottle this indicates that the milk is not up to the proper requirements or that some kind of milk has been placed in the bottle other than that for which it was intended. Therefore, the bottle itself constitutes proof of the quality of the milk which it contains. It is obvious that when the bottle is designed and used for a certain kind of milk which contains a high percentage of butter fat, other kinds of milk, which more than likely would contain a smaller percentage of butter fat, would show a cream line above the line 3 on the bottle. Therefore, if the bottle is used for milk other than that for which it is intended, the cream line of the milk would probably not come down to the line 3 on the bottle. The bottle will therefore serve to create a demand for the kind of milk for which it is intended and will thus stimulate the sale of that kind of milk. Obviously the public will prefer the milk having the lowest cream line and will be reluctant to purchase or use any milk contained in a bottle such as that herein disclosed if the actual cream line is above the line 3 on the bottle. The indicia 6 on the reverse side of the bottle is convenient for household purposes as it indicates just how much cream should be used for coffee, or similar purposes, and gives an indication of what portion of the milk in the bottle contains approximately the proper amount of butter fat for the baby. The bottle may contain any other information that is desired such as the name of the farm supplying the milk, etc.

It will be understood, of course, that the indicating lines on the bottle should be used for their respective purposes only when the milk has been standing in the bottle a sufficient length of time for all of the cream to form at the top. In other words, the indicating lines obviously could not perform their function if the milk and cream are mixed in the bottle. Furthermore, the line 3 should be placed on the bottle at the approximate place where the actual cream line of the milk will appear when all of the cream has risen.

I claim:

1. A milk bottle having indicia thereon identifying a certain milk, and provided with indicating means on the bottle located at, and indicating, the proper location of the cream line for the particular milk identified by the indicia, whereby the cream line of any therein contained milk may be compared with the indicated cream line of the particular milk identified by the indicia.

2. A milk bottle having indicia thereon identifying a certain milk, and provided with indicating means on the bottle located at, indicating, and identifying as such by associated indicia, the proper location of the cream line for the particular milk identified by the indicia, whereby the cream line of any therein contained milk may be compared with the indicated cream line of the particular milk identified by the indicia.

3. A milk bottle having indicia thereon identifying a certain milk, and provided with an indicating line on the bottle located at, and indicating, the proper location of the cream line for the particular milk identified by the indicia, whereby the cream line of any therein contained milk may be compared with the indicated cream line of the particular milk identified by the indicia.

In testimony whereof I affix my signature.

OSCAR H. BAKER.